(12) United States Patent
Dürr

(10) Patent No.: US 11,376,749 B2
(45) Date of Patent: Jul. 5, 2022

(54) GRIPPING FINGER HAVING CURVED SPACING ELEMENTS, AND ADAPTIVE GRIPPING DEVICE

(71) Applicant: SIEMENS AKTIENGESELLSCHAFT, Munich (DE)

(72) Inventor: Matthias Dürr, Bayern (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 17/290,255

(22) PCT Filed: Oct. 30, 2018

(86) PCT No.: PCT/EP2018/079650
§ 371 (c)(1),
(2) Date: Apr. 29, 2021

(87) PCT Pub. No.: WO2020/088741
PCT Pub. Date: May 7, 2020

(65) Prior Publication Data
US 2021/0362353 A1 Nov. 25, 2021

(51) Int. Cl.
*B25J 15/12* (2006.01)
(52) U.S. Cl.
CPC .................. *B25J 15/12* (2013.01)
(58) Field of Classification Search
CPC ...................................................... B25J 15/12
See application file for complete search history.

(56) References Cited

U.S. PATENT DOCUMENTS

| 4,850,631 A * | 7/1989 | Dotsko | B25J 13/084 |
| | | | 294/86.4 |
| 7,654,595 B2 * | 2/2010 | Yokoyama | B25J 9/142 |
| | | | 294/99.1 |

(Continued)

FOREIGN PATENT DOCUMENTS

| CN | 106999787 A | 8/2017 |
| CN | 107671878 A | 2/2018 |

(Continued)

OTHER PUBLICATIONS

International Search Report and the Written Opinion for International Patent Application PCT/EP2018/079650 dated Aug. 26, 2019.

(Continued)

*Primary Examiner* — Stephen A Vu
(74) *Attorney, Agent, or Firm* — Lempia Summerfield Katz LLC

(57) ABSTRACT

The invention relates to a gripping finger (1) for an adaptive gripping device (10), comprising a first strip element (2) and a second strip element (3), which are flexible, and a plurality of spacing elements (7, 13, 16), which are arranged between the first strip element (2) and the second strip element (3). A first end (8) of each of the spacing elements (7, 13, 16) is movably connected to the first strip element (2) and an opposite second end (9) of each of the spacing elements (7, 13, 16) is movably connected to the second strip element (3). At least one of the spacing elements (7, 13, 16) is designed as a curved spacing element (13), the curved spacing element (13) having a predefined curvature.

16 Claims, 4 Drawing Sheets

(56) References Cited

U.S. PATENT DOCUMENTS

| | | | |
|---|---|---|---|
| 8,011,708 B2* | 9/2011 | Becker | B25J 15/0226 |
| | | | 294/196 |
| 9,505,135 B1* | 11/2016 | Malstrom | B25J 15/0033 |
| 9,914,214 B1* | 3/2018 | Strauss | B25J 15/12 |
| 2010/0263500 A1 | 10/2010 | Bannasch et al. | |
| 2013/0154294 A1* | 6/2013 | Shiomi | B25J 15/12 |
| | | | 294/213 |
| 2015/0032152 A1 | 1/2015 | Frings | |
| 2017/0232356 A1 | 8/2017 | Pasternak | |
| 2017/0297210 A1 | 10/2017 | Takikawa et al. | |
| 2018/0117773 A1 | 5/2018 | Odhner et al. | |

FOREIGN PATENT DOCUMENTS

| | | |
|---|---|---|
| CN | 108687794 A | 10/2018 |
| CN | 109176591 A | 1/2019 |
| DE | 102014014891 A1 | 4/2016 |
| EP | 2735406 A1 | 5/2014 |
| JP | S50117165 A | 9/1975 |
| JP | 2013123786 A | 6/2013 |
| JP | 2017001113 A | 1/2017 |
| JP | 2017189861 A | 10/2017 |
| WO | 2018230729 A1 | 12/2018 |

OTHER PUBLICATIONS

Notice of Submission the International Provisional Patentability Report for International Patent Application No. PCT/EP2018/079650 dated Feb. 2, 2021, with English translation.

Basson, Christian Ivan, Glen Bright, and Anthony John Walker. "Validating object conformity through geometric considerations of gripper mechanisms." 2017 24th International Conference on Mechatronics and Machine Vision in Practice (M2VIP). IEEE, 2017. pp. 1-6.

Notice of Submission the International Provisional Patentability Report for International Patent Application No. PCT/EP2018/079650 dated Feb. 2, 2021.

* cited by examiner

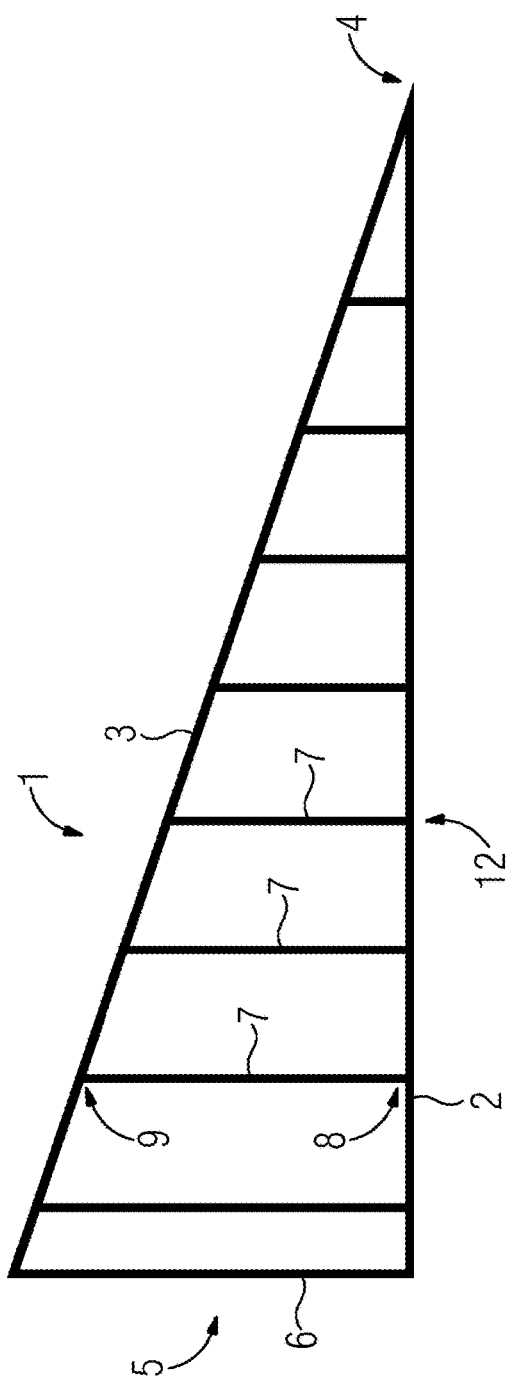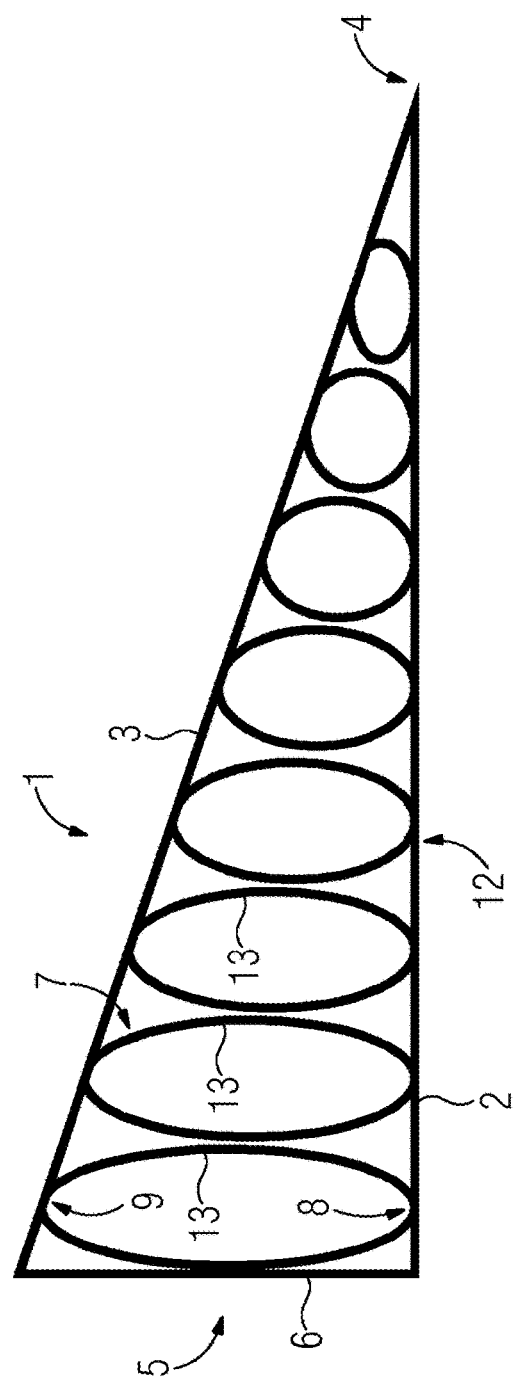

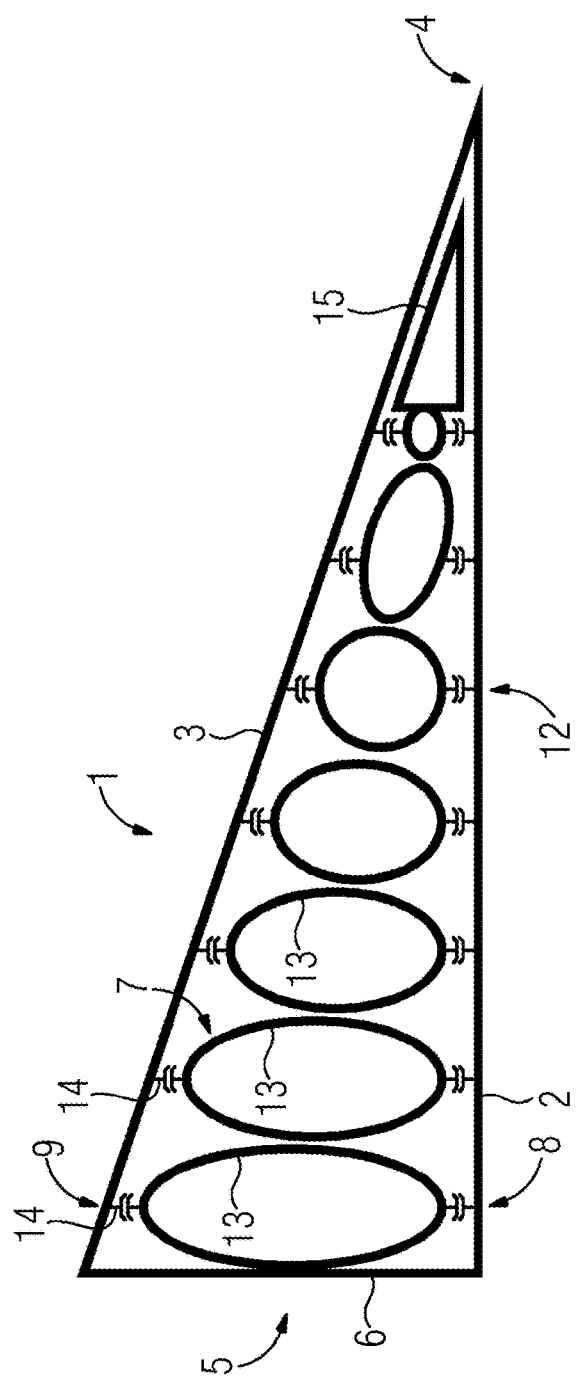
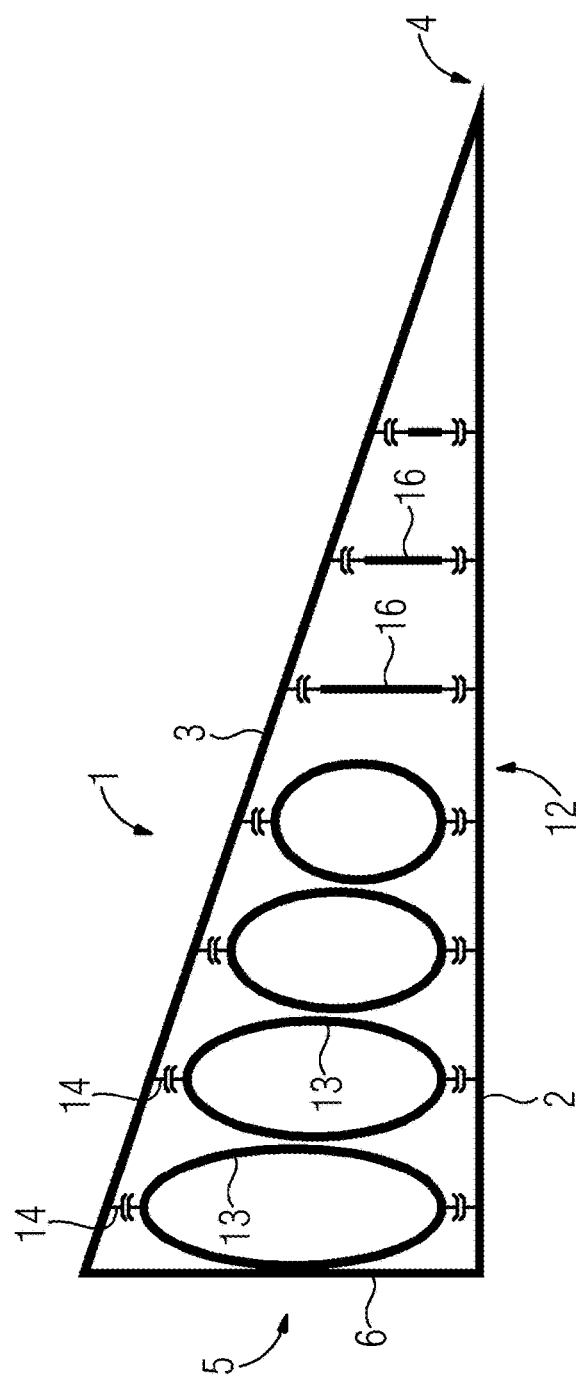

GRIPPING FINGER HAVING CURVED SPACING ELEMENTS, AND ADAPTIVE GRIPPING DEVICE

This application is the National Stage of International Application No. PCT/EP2018/079650, filed Oct. 30, 2018. The entire contents of this document is hereby incorporated herein by reference.

BACKGROUND

The present embodiments relate to a gripping finger for an adaptive gripping device, and an adaptive gripping device with such a gripping finger.

Gripping devices are used for grasping and holding a part. Such gripping devices may be used, for example, in robots, production plants, or the like. Adaptive gripping devices that have gripping fingers that use what is referred to as the Fin Ray Effect® are known from the prior art. In the event of a compressive loading, such gripping fingers do not move away from the compressive force, as would be anticipated, but rather are curved in the direction of the compressive force.

Such gripping devices or gripping fingers that use the Fin Ray Effect® conventionally include a first strip element and a second strip element that are flexible. In addition, the strip elements are connected to each other on one side and form part of an acute triangle. Spacing elements are arranged between the strip elements and are movably connected to the strip elements. The spacing elements keep the strip elements at a distance, and an elastic movement of the gripping finger is permitted. The respective spacing elements are conventionally rectilinear and formed from a stiff material.

Such a gripping finger is conventionally relatively stiff or inflexible in the region of the tip. A spot load may be exerted, for example, on a part that is to be held. In a central region of the gripping finger, the gripping finger is flexible and, on gripping a part, may assume the contour of the part at least in regions. In the case of parts having a special shape (e.g., in the case of parts having a rectangular cross section) and/or in the event of higher holding forces, overloads may occur at the gripping finger. For example, the strip elements may be undesirably deformed, or the bearings between the spacing elements and the strip elements may be loaded. Further, the adaptability of the gripping element is limited.

SUMMARY AND DESCRIPTION

The scope of the present invention is defined solely by the appended claims and is not affected to any degree by the statements within this summary.

The present embodiments may obviate one or more of the drawbacks or limitations in the related art. For example, a solution for how a gripping finger may be adapted in a simple manner to a gripping task is provided.

A gripping finger according to the present embodiments for an adaptive gripping device includes a first strip element and a second strip element that are flexible. Further, the gripping finger includes a plurality of spacing elements that are arranged between the first strip element and the second strip element. A first end of the respective spacing elements is movably connected to, for example, the first strip element, and a second end of the respective strip elements is movably connected to, for example, the second strip element. The second end is opposite the first end. Further, at least one of the spacing elements is configured as a curved spacing element, where the curved spacing element has a predefined curvature.

The gripping finger may be used in a gripping device or in a gripper. For example, the gripping finger may be used in a mechanical gripping device that may be used to grasp and hold a part or component. The gripping finger includes the first strip element and the second strip element. The first strip element and the second strip element are flexible and elastic. The first strip element and the second strip element may have the form of a strip. The first strip element and the second strip element may be connected to each other at a tip of the gripping finger. On a side opposite the tip, the strip elements may be connected to each other by a connecting element such that the first strip element, the second strip element, and the connecting element form a right-angled triangle. In the region of the connecting element, the gripping finger may be held within the gripping device. The first strip element may have, for example, a gripping surface that is used for gripping the part. During the gripping of the part, the gripping surface may lie against the part at least in regions.

Further, the gripping finger includes the plurality of spacing elements. The spacing elements are in each case arranged between the first strip element and the second strip element. The respective spacing elements are movably connected at the first end to the first strip element and are movably connected at the opposite second end to the second strip element. For example, the respective ends of the spacing elements are mounted rotatably on the associated strip elements. A bearing or joint may be formed between the respective ends of the spacing elements and the associated strip elements. Further, a connection in the form of a film hinge may be formed between the respective spacing elements and the strip elements. For example, the connection between the ends of a spacing element and the strip elements is configured such that the spacing element may be pivoted with respect to an axis of rotation that runs parallel to the gripping surface. The gripping finger may thus be adapted to a contour of the part that is gripped with the gripping finger. For example, the gripping finger uses the Fin Ray Effect®.

According to an aspect of the present embodiments, at least one of the spacing elements is configured as a curved spacing element. The at least one curved spacing element has a predefined curvature that differs from zero. The curved spacing element has the predefined curvature in the unloaded state or without an external application of force. The gripping finger therefore has the plurality of spacing elements, of which at least one is configured as a curved spacing element. It is also possible for a plurality of or all of the spacing elements to be configured as curved spacing elements. The curved spacing element may be curved or arched in, for example, a direction perpendicular to a main direction of extent. The curved spacing element is thus elastic and/or produced from an elastic material. For example, it is provided that the curved spacing element is elastically deformed during the gripping of the part. An elastic connection between the first strip element and the second strip element may thus be provided. The mechanical properties of the curved spacing element may be predetermined by the curvature or the shaping. The curved spacing element may thus be adapted to the part to be gripped or to the gripping task. In addition, additional degrees of freedom arise for the gripping finger.

The curved spacing element may be curved at the first end and/or at the second end. The curved spacing element has the predefined curvature. The curvature may extend over an entire length of the curved spacing element. The curvature of the curved spacing element may also extend as far as the first end and/or the second end. By the curvature at the first end and/or the second end or at the connecting regions between the curved spacing element and the strip elements, an abrupt change in the direction of the force may be avoided. Further, a punctiform or local action of force on the connecting regions may be prevented. A local overload in the connecting regions may thereby be opposed. The stability of the gripping finger may thus be improved. Further, the first strip element and/or the second strip element may be elastic. As a result of this, the adaptability to the part that is to be gripped is improved.

In one embodiment, the curved spacing element is configured such that, in the event of a deformation as a result of an action of force on the first strip element, the curved spacing element touches a spacing element that is adjacent to the curved spacing element. When the part is gripped by the gripping finger, the first strip element is elastically deformed. Force is transmitted from, for example, the first strip element to the second strip element via the spacing elements. The at least one curved spacing element is elastically deformed in the process. For example, the curved spacing element is deformed in the direction of at least one adjacent spacing element. The shaping and/or the mechanical properties of the curved spacing element may be determined, for example, such that the curved spacing element, upon deformation, touches the adjacent spacing element. The elastic deformation or the movement of the curved spacing element is thus limited above a certain load by the adjacent spacing element. The effect that may thus be achieved, for example, is that the elastic deformation of the curved spacing element is reduced as the action of force from the outside increases. In addition, the mechanical properties may be adapted by, for example, the distances between the spacing elements. The curved spacing element may also be configured such that the curved spacing element touches at least an adjacent spacing element without an external action of force on the gripping finger.

In a further refinement, the curved spacing element is oval in cross section. For example, the curved spacing element may be elliptical in cross section. The curved spacing element may have the form of a strip with an oval cross section. The rigidity of the spacing element may be predetermined by the aspect ratio or the ratio between length and width of the curved spacing element. In addition, the mechanical properties may be influenced by the orientation of the curved oval spacing element. The gripping finger may thus be adapted in a simple manner to the gripping task.

According to an alternative embodiment, the gripping finger has two adjacent curved spacing elements, where the two adjacent curved spacing elements are arched in opposite directions. These curved spacing elements may be strip-shaped. One of the curved spacing elements may be made to bulge in the first direction, and the other of the spacing elements may be made to bulge in the opposite direction. The two adjacent curved spacing elements may together have a substantially oval shape in cross section. By this, the shaping of each of the curved spacing elements may be adapted to the application.

In a further embodiment, at least one of the spacing elements is rectilinear. As explained previously, at least one of the spacing elements is configured as a curved spacing element. In addition, at least one of the spacing elements may be in the form of a rectilinear spacing element. This rectilinear spacing element, for example, does not have a curvature. For example, the rectilinear spacing element is stiff or has a significantly greater rigidity in comparison to the curved spacing element. In addition, the rectilinear spacing element may be produced from a stiff material. The selection of curved and rectilinear spacing elements makes it possible for the mechanical properties of the gripping finger to be individually adapted.

Further, it is advantageous if the gripping finger has at least one stiffening element that is arranged between the first strip element and the second strip element. For example, this stiffening element may be fixedly connected to the first strip element and to the second strip element. This stiffening element may be arranged, for example, in the region of a tip of the gripping finger. Small parts or parts with a relatively small diameter may thereby be precisely gripped.

In a further embodiment, the respective spacing elements are reversibly releasably connected to the first strip element and to the second strip element. For example, the respective spacing elements may be nondestructively releasably connected to the strip elements. It may also be provided that only some of the spacing elements are reversibly releasably connected to the strip elements. The spacing elements and the strip elements may have mutually corresponding fastening elements in order to provide the releasable connection. For example, the spacing elements may be connected to the strip elements by a latching connection, a snap connection, a dovetail connection, or the like. This permits a simple and reliable connection between the spacing elements and the strip elements. In addition, the spacing elements may be exchanged.

It is, for example, provided in this connection that the gripping finger is modular and has different types of spacing elements that are connectable or are reversibly releasably connected to the first strip element and to the second strip element. The strip elements may have corresponding fastening elements on which spacing elements may be arranged. Depending on the field of use of the gripping finger or depending on the part that is to be gripped, the appropriate spacing elements may then be selected. For example, a curved or a rectilinear spacing element may be selected. When a curved spacing element is used, a choice may be made, for example, between different curvatures or shapes. For example, the gripping finger may be provided in the form of a modular system with different types of spacing elements.

The gripping finger may be produced by an additive production method. For example, it is provided that the gripping finger is produced by a three-dimensional printing method. The gripping finger may be produced from a plastic. For example, the gripping finger may be produced from a flexible plastic or from an elastomer. The strip elements and the spacing elements may be produced from the same material but also from different materials. The additive production method permits a simple and cost-effective production of the gripping finger.

An adaptive gripping device according to the present embodiments serves for grasping and holding a part. The gripping device includes at least one gripping finger according to the present embodiments. For example, the gripping device is in the form of a mechanical gripper. The gripping device may also have a drive for moving the gripping fingers. The drive of the gripping device may be formed mechanically, pneumatically, or electrically, for example.

A further aspect of the present embodiments relates to a method for producing a gripping finger. A first strip element and a second strip element, which are flexible, are provided, for example. Further, a plurality of spacing elements are arranged between the first strip element and the second strip element. A first end of the respective spacing elements is movably connected to the first strip element, and an opposite second end of the respective spacing elements is movably connected to the second strip element. It is provided that, for example, at least one of the spacing elements is configured as a curved spacing element, where the curved spacing element has a predefined curvature.

The embodiments presented with regard to the gripping finger and the advantages of the embodiments apply correspondingly to the gripping device according to the present embodiments and to the method according to the present embodiments.

Further features of the present embodiments emerge from the claims, the figures, and the description of the figures. The features and combinations of features mentioned in the description and the features and combinations of features that are mentioned below in the description of the figures and/or are shown on their own in the figures are usable not only in the respectively stated combination, but also in other combinations, without departing from the scope of the invention.

BRIEF DESCRIPTION OF THE DRAWINGS

FIG. 1 shows a schematic illustration of a gripping finger according to the prior art;

FIG. 2 shows a schematic illustration of a gripping finger according to a first embodiment;

FIG. 4 shows a schematic illustration of a gripping finger according to a second embodiment;

FIG. 5 shows a schematic illustration of a gripping finger according to a third embodiment.

DETAILED DESCRIPTION

Figure 3:
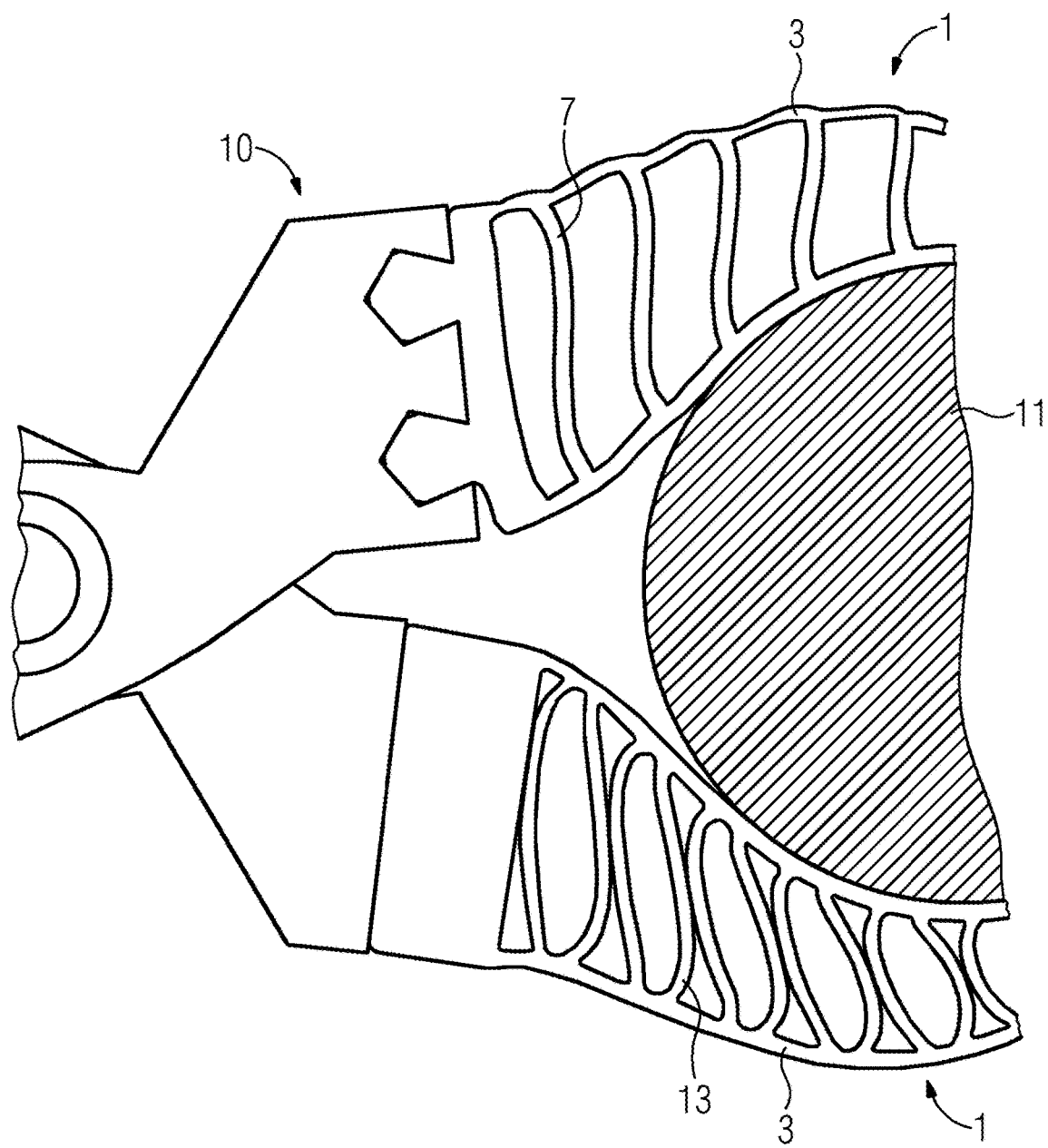
FIG. 3 shows a gripping device with a gripping finger according to the prior art and with a gripping finger according to the first embodiment.

In the figures, same or functionally same elements are provided with the same reference signs.

FIG. 1 shows, in a schematic illustration, a gripping finger 1 according to the prior art. The gripping finger 1 includes a first strip element 2 and a second strip element 3. The first strip element 2 and the second strip element 3 are produced from a flexible material (e.g., an appropriate plastic). The first strip element 2 and the second strip element 3 are connected to each other at a tip 4 of the gripping finger 1. On a side 5 opposite the tip 4, the first strip element 2 and the second strip element 3 are connected to each other by a connecting element 6. Further, the gripping finger 1 includes a plurality of spacing elements 7 that are arranged between the first strip element 2 and the second strip element 3. The respective spacing elements 7 have a first end 8 that is connected to the first strip element 2, and a second end 9 that is connected to the second strip element 3. The first end 8 and the end 9 of the respective spacing elements 7 are movably connected to the first strip element 2 and the second strip element 3.

The gripping finger 1 may be used in a gripping device 10 for gripping a part 11. The first strip element 2 has a gripping surface 12 that, during the gripping of a part 11, is in contact with the part 11 at least in regions. A material that increases friction between the gripping finger 1 and the part 11 may be applied in the region of the gripping surface 12. The gripping finger 1 uses what is referred to as the Fin Ray Effect®. In the event of a compressive loading, the gripping finger 1 does not move away from the compressive force, as would be anticipated, but rather is curved in the direction of the compressive force. In the case of the gripping finger 1 according to the prior art, the spacing elements 7 are stiff. In the case of certain shapes of the parts 11 and/or depending on the gripping force, this may lead to an inadvertent deformation of the gripping finger 1.

In contrast thereto, FIG. 2 shows a schematic illustration of a gripping finger 1 according to a first embodiment. This gripping finger 1 differs from the gripping finger 1 according to FIG. 1 in that the spacing elements 7 are configured as curved spacing elements 13. In the present exemplary embodiment, the curved spacing elements 13 are configured such that the curved spacing elements 13 have an oval cross section. The curved spacing elements 13 are also movably connected at the first end 8 to the first strip element 2 and are movably connected at the second end 9 to the second strip element 3.

FIG. 3 shows an illustration of a gripping device 10 that, by way of example, has a gripping finger 1 according to the prior art on an upper side and a gripping finger 1 according to the first embodiment on a lower side. FIG. 3 shows that, in the case of the gripping finger 1 according to the prior art, an inadvertent deformation of the second strip element 3 arises because of a large diameter of the part 11. This provides that the functionality of the gripping device 10 cannot be ensured. Further, there is the risk of the gripping finger 1 becoming damaged. In comparison thereto, in the case of the gripping finger 1 according to the first embodiment, no inadvertent deformation of the individual components of the gripping finger 1 may be seen on the lower side of the gripping device 10.

This improvement of the gripping finger 1 with the curved spacing elements 13 is first established by the curved spacing elements 13 or the oval spacing elements providing an elastic connection between the first strip element 2 and the second strip element 3. By this, the absorption of forces by material deformation is distributed over relatively large material portions. Peaks in the deformation are thus avoided. The rigidity or the elastic properties of the curved spacing elements 13 may be defined by the aspect ratio of the curved spacing elements 13.

Further, the elastic deformation of the oval spacing elements or curved spacing elements 13 is limited by the adjacent spacing elements 13. If the spacing elements 13 are at a predefined distance from one another, the deformation of the respective curved spacing elements 13 is limited as soon as a certain threshold value is reached. This is the case if the adjacent spacing elements 13 touch one another because of the deformation. In this case, the elastic or mechanical properties of the curved spacing elements 13 may be defined by a distance of the adjacent curved spacing elements 13 from one another.

In addition, the advantage arises that the curved spacing elements 13 also have a curvature at the first end 8 and the second end 9. Forces induced laterally in the first strip element 2 and the second strip element 3 may thereby be compensated for along the first strip element 2 and the second strip element 3. Further, punctiform loads or overloads at the connecting regions between the curved spacing elements 13 and the first strip element 2 and the second strip element 3 may be prevented. The curvature of the curved spacing elements 13 may have an influence on the transmission of the load between the spacing elements 13 and the first strip element 2 and the second strip element 3.

FIG. 4 shows a gripping finger 1 according to a second embodiment in a schematic illustration. The curved spacing elements 13 are likewise configured, for example, such that the curved spacing elements 13 have an oval cross section. Further, corresponding fastening elements 14 are provided at the first end 8 and the second end 9 of the spacing elements 13. By the fastening elements 14, the spacing elements 13 may be reversibly releasably connected to the first strip element 2 and the second strip element 3. This results in a modular design of the gripping finger 1 in which the respective spacing elements 13 may be exchanged. Further, the gripping finger 1 includes a stiffening element 15 that serves for mechanically stiffening the gripping finger 1 in the region of the tip 4. This stiffening element 15 may be stiff and may be fixedly connected to the first strip element 2 and to the second strip element 3.

FIG. 5 shows a third embodiment of a gripping finger 1 in a schematic illustration. The gripping finger 1 has, for example, both curved spacing elements 13 and spacing elements 7 that are in the form of rectilinear spacing elements 16. The rectilinear spacing elements 16 do not have a curvature and may be stiff. A front region of the gripping finger 1 with the rectilinear spacing elements 16 may thus be stiffer than a rear part of the gripping finger 1 with the curved spacing elements 13. Also, in this case, the respective spacing elements 13, 16 are reversibly releasably connected to the first strip element 2 and the second strip element 3 by the fastening elements 14.

Figure 6:
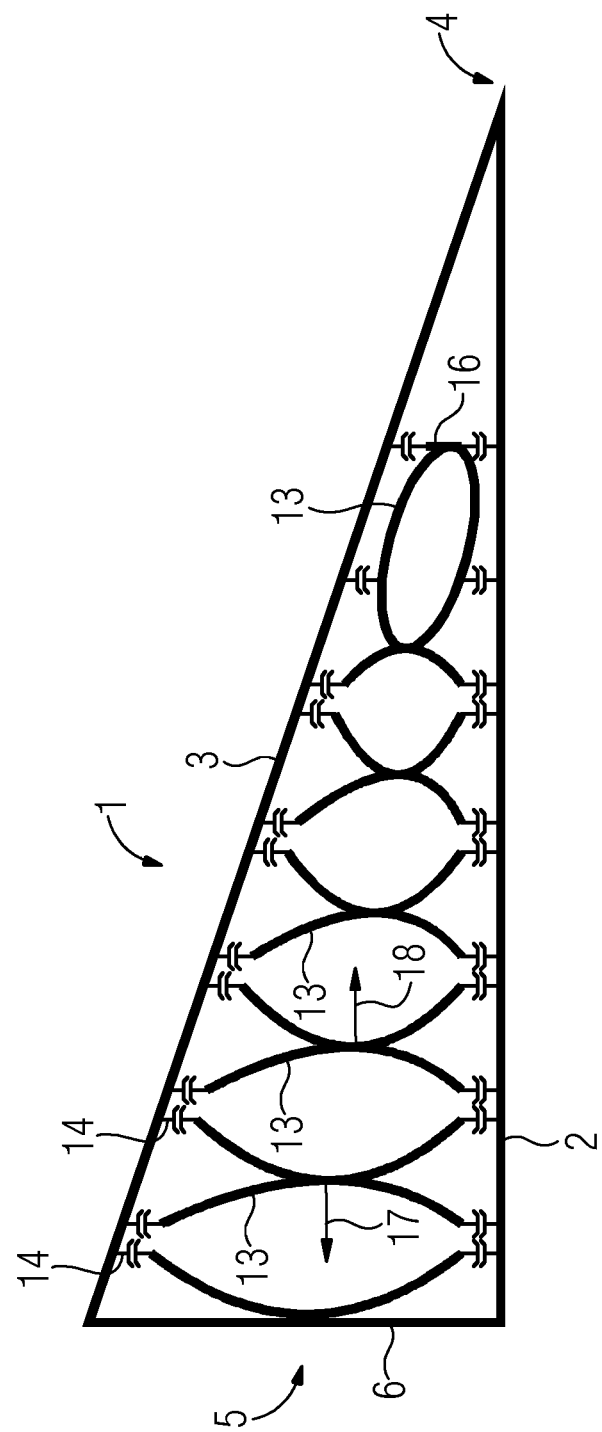
FIG. 6 shows a schematic illustration of a gripping finger according to a fourth embodiment.

FIG. 6 shows, in a schematic illustration, a fourth embodiment of a gripping finger 1 in a schematic illustration. The gripping finger 1 likewise has, for example, curved spacing elements 13. Adjacent curved spacing elements 13 are configured, for example, such that one of the spacing elements 13 is curved in a first direction 17 and the other of the spacing elements 13 is curved in a second direction 18 that is opposite the first direction 17. These two adjacent spacing elements 13 likewise form a substantially oval cross section. In addition, the gripping finger 1 has a curved spacing element 13 that has an oval cross section, and a rectilinear spacing element 16. The modular design of the gripping finger 1 enables the gripping finger 1 to be adapted to the respective gripping situation or to the part 11 that is to be gripped.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A gripping finger for an adaptive gripping device, the gripping finger comprising:
    a first strip element and a second strip element that are flexible; and
    a plurality of spacing elements that are arranged between the first strip element and the second strip element,
    wherein a first end of the respective spacing elements is movably connected to the first strip element, and a second end of the respective spacing elements is movably connected to the second strip element, the second end being opposite the first end,
    wherein at least one spacing element of the plurality of spacing elements is configured as a curved spacing element, the curved spacing element having a predefined curvature,
    wherein the curved spacing element is configured such that, in the event of a deformation as a result of an action of force on the first strip element, the curved spacing element touches a spacing element of the plurality of spacing elements that is adjacent to the curved spacing element, and
    wherein the curved spacing element is curved at the first end, at the second end, or at the first end and the second end.

2. The gripping finger of claim 1, wherein the curved spacing element is oval in cross section.

3. The gripping finger of claim 1, wherein the at least one spacing element comprises two adjacent curved spacing elements, and
    wherein the two adjacent curved spacing elements are arched in opposite directions.

4. The gripping finger of claim 1, wherein one or more spacing elements of the plurality of spacing elements are in the form of a rectilinear spacing element.

5. The gripping finger of claim 1, wherein the gripping finger has at least one stiffening element that is arranged between the first strip element and the second strip element.

6. The gripping finger of claim 1, wherein the respective spacing elements are reversibly releasably connected to the first strip element and to the second strip element.

7. The gripping finger of claim 6, wherein the gripping finger is modular and has different types of spacing elements that are reversibly releasably connected to the first strip element and to the second strip element.

8. The gripping finger of claim 1, wherein the gripping finger is an additive manufactured gripping finger.

9. An adaptive gripping device for grasping and holding a part, the adaptive gripping device comprising:
    at least one gripping finger, a gripping finger of the at least one gripping finger comprising:
        a first strip element and a second strip element that are flexible; and
        a plurality of spacing elements that are arranged between the first strip element and the second strip element,
    wherein a first end of the respective spacing elements is movably connected to the first strip element, and a second end of the respective spacing elements is movably connected to the second strip element, the second end being opposite the first end,
    wherein at least one spacing element of the plurality of spacing elements is configured as a curved spacing element, the curved spacing element having a predefined curvature,
    wherein the curved spacing element is configured such that, in the event of a deformation as a result of an action of force on the first strip element, the curved spacing element touches a spacing element of the plurality of spacing elements that is adjacent to the curved spacing element, wherein the curved spacing element is curved at the first end, at the second end, or at the first end and the second end.

10. The adaptive gripping device of claim 9, wherein the curved spacing element is oval in cross section.

11. The adaptive gripping device of claim 9, wherein the at least one spacing element comprises two adjacent curved spacing elements, and
wherein the two adjacent curved spacing elements are arched in opposite directions.

12. The adaptive gripping device of claim 9, wherein one or more spacing elements of the plurality of spacing elements are in the form of a rectilinear spacing element.

13. The adaptive gripping device of claim 9, wherein the gripping finger has at least one stiffening element that is arranged between the first strip element and the second strip element.

14. The adaptive gripping device of claim 9, wherein the respective spacing elements are reversibly releasably connected to the first strip element and to the second strip element.

15. The adaptive gripping device of claim 14, wherein the gripping finger is modular and has different types of spacing elements that are reversibly releasably connected to the first strip element and to the second strip element.

16. The adaptive gripping device of claim 9, wherein the gripping finger is an additive manufactured gripping finger.

\* \* \* \* \*